Dec. 1, 1959  E. GRETENER  2,914,989
REFLECTOR
Filed Oct. 8, 1954

INVENTOR.
Edgar Gretener
BY
Pierce, Scheffler & Parker
att'ys

United States Patent Office 2,914,989
Patented Dec. 1, 1959

2,914,989

REFLECTOR

Edgar Gretener, Zurich, Switzerland

Application October 8, 1954, Serial No. 461,271

Claims priority, application Switzerland October 8, 1953

3 Claims. (Cl. 88—105)

The present invention is related to a reflector particularly for light sources for projection purposes, such as motion picture projection or others.

Such light sources, e.g. as they are employed for projection purposes, not only produce utilizable radiation, i.e. visible light, but also to a considerable extent infra-red radiation, i.e. radiating heat. This radiating heat sets the limit for the maximum admissible projection light flux, i.e. the maximum attainable brightness of the projected picture, as the thermic capacity of the projected film is limited, so that the amount of heat absorbed within the film from the visible and the infrared radiation must not exceed a well defined value.

The present invention has tne object to remedy this deficiency. It is directed to a reflector particularly for light sources for projection purpose and is characterized by a reflecting coating, a metallic support and an absorbing layer in between coating and support, the coating reflecting visible light, but transmitting invisible radiation, whereas the absorbing layer practically fully absorbs all radiation within the range transmitted by the coating.

Figure 1:
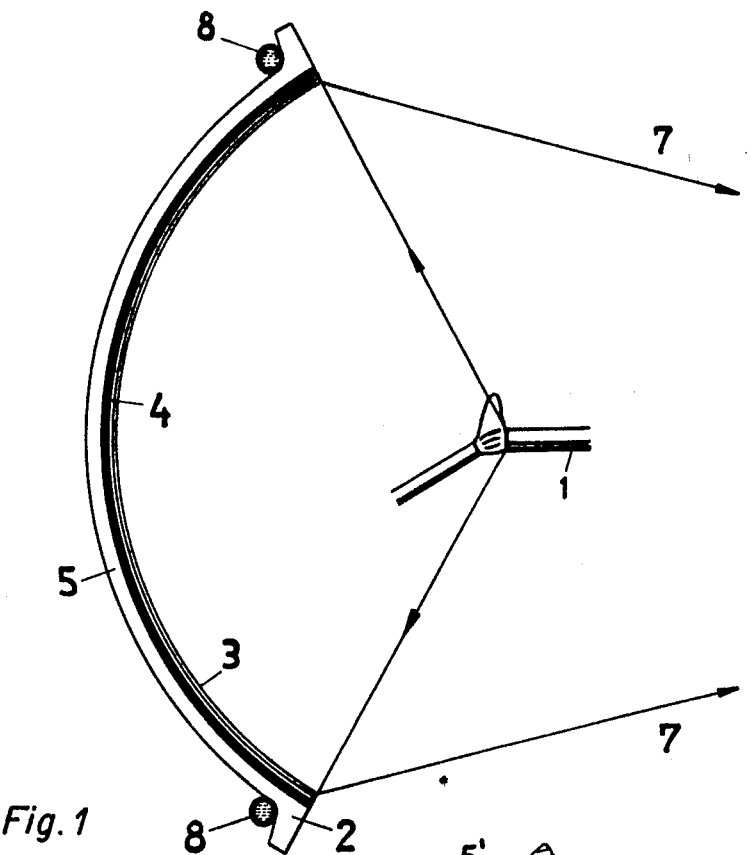
Figure 2:
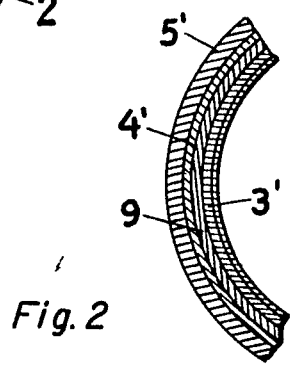

The present invention will be explained with the aid of the attached drawings, which represents a concave mirror as an embodiment of the present invention. Fig. 1 is a view showing one construction for the mirror or reflector and Fig. 2 is a similar view in section illustrating a slightly modified construction.

The concave mirror, by way of example, be of the elliptic type customarily used with high intensity light source for projection. The light source, by way of example an electric arc produced in the gap between the ends of electrodes 1, is disposed at the first focus, the aperture (not shown) at the emplacement of the second focus of reflector 2. According to the present invention the reflector is fitted with a reflecting coating 3, which reflects to utmost extent visible light but which transmits invisible radiation as much as possible.

Reflecting coating of this kind are well known. Customarily they have the form of interference filters, which consist of a great number of very thin layers with alternatively high and low coefficient of refraction. Index of refraction and thickness of layers are chosen with regard to the ranges of wave lengths of the transmitted or refracted radiation respectively. This kind of reflecting coating thus causes the visible radiation generated in the arc to be concentrated in a correct manner upon the aperture in direction of rays 7 whereas the invisible radiation passes through the coating 3.

Underneath of coating 3 an absorbing layer 4 is located which absorbs as much as possible of the radiation within the spectral range passed through coating 3. Basically, however, any black surface with sufficiently low reflection will be suitable.

The absorption layer 4 is located immediately upon the support 5, which consists of metal. Consequently the heat energy absorbed by layer 4 will not cause an excessive heating of this layer, but will pass through to the support. Due to the high thermic conductivity the received heat energy may be easily led away. Preferably the metal support may be cooled, by way of example, by air or by a tube 8 extending along the rim, through which a cooling liquid passes.

The advantage of such an arrangement resides in the fact that a bowl of metal is used as support for the reflecting layer. Due to its high thermal conductivity unavoidable sputterings emanating from the arc will not cause burning of the reflecting layer. In contrast thereto mirrors with glass support are very liable to be damaged by such sputterings as the thermal conductivity is poor.

By the combination of a reflecting layer transmitting infrared but reflecting visible light with an intermediate layer absorbing at least in the infrared range a selective spectral filter may be employed for separating light and infrared radiation notwithstanding employment of a metallic mirror support.

Customarily such interference filter layers are produced by evaporation in vacuum. A reflector may thus be produced by first applying an absorbing layer to the support bowl, by way of example also by evaporation, and that subsequently the interference layers are applied. In order to obtain a high quality of the reflector surface, the support bowl is ground before applying the layers and polished to optical quality.

Particularly high absorbing, i.e. deep black layers have become known wherein absorption is caused by the coarseness of the surface. If such a layer is employed in the present case an intermediate layer, by way of example, a lacquer is applied to provide a smooth base for the reflecting interference filter layer. Such an embodiment is illustrated in Fig. 2. Those components identical in function with corresponding components in the Fig. 1 embodiment have been given the same reference numerals but with primes added for purposes of distinction. Thus the concave metallic support is shown at 5', the deep black absorption layer with a coarse surface is shown at 4', the smoothing lacquer on the coarse surface of the absorption layer is indicated at 9 and the reflecting layer on the lacquer layer is shown at 3'.

I claim:

1. In a reflector structure for reflecting the light from a source such as a carbon arc particularly for projection purposes, the combination comprising a metallic support having a high thermal conductivity characteristic, an absorption layer of black material applied to one surface of said metallic support for absorbing substantially all infra red heat radiation thereby to prevent its reflection from said metallic support, said absorption layer having a smooth surface, and a multi-layer interference type reflecting coating applied to said smooth surface of said absorption layer for reflecting substantially all visible light and transmitting therethrough to said absorption layer substantially all infra red heat radiation.

2. A reflector structure as defined in claim 1 and which further includes fluid coolant means provided at the surface of said metallic support opposite that to which said absorption layer and reflecting coating are applied for conveying away the heat of infra red radiation absorbed by said absorption layer.

3. A reflector structure as defined in claim 1 wherein said absorption layer is constituted by a deep black material having a coarse characteristic and said smooth surface of said absorption layer is established by application of a lacquer to the surface of said deep black material.

References Cited in the file of this patent

UNITED STATES PATENTS

| 2,375,669 | McKinney | May 8, 1945 |
| 2,519,722 | Turner | Aug. 22, 1950 |
| 2,552,184 | Koch | May 8, 1951 |
| 2,624,238 | Widdop et al. | Jan. 6, 1953 |
| 2,660,925 | Turner | Dec. 1, 1953 |
| 2,700,323 | Schroder | Jan. 25, 1955 |

FOREIGN PATENTS

| 404,104 | Great Britain | Jan. 11, 1934 |

OTHER REFERENCES

"Heat Transmitting Mirror," Dimmick, article in "The International Projectionist," vol. 27, No. 2, February 1952, pages 14, 17 and 27–29 cited